United States Patent [19]

Iwanami et al.

[11] Patent Number: 4,883,696
[45] Date of Patent: Nov. 28, 1989

[54] LAMINATE

[75] Inventors: Teruo Iwanami, Ibaraki; Takamasa Moriyama, Suita; Kuniyoshi Asano, Hirakata, all of Japan

[73] Assignee: Nippon Gohsei Kaguku Kogyo Kabushikis Kaisha, Osaka, Japan

[21] Appl. No.: 273,571

[22] Filed: Nov. 21, 1988

Related U.S. Application Data

[63] Continuation-in-part of Ser. No. 115,041, Oct. 30, 1987, abandoned.

[30] Foreign Application Priority Data

Nov. 1, 1986 [JP] Japan ................................. 61-261037

[51] Int. Cl.$^4$ ........................ B32B 27/08; C08L 29/04
[52] U.S. Cl. .................................. 428/35.4; 428/366;
428/36.7; 428/212; 428/412; 428/475.2;
428/476.3; 428/483; 428/515; 428/518;
428/520; 428/522; 525/57
[58] Field of Search ................ 525/57; 428/35.4, 36.6,
428/36.7, 412, 475.2, 476.3, 483, 500, 31.5, 212,
518, 520, 522

[56] References Cited

U.S. PATENT DOCUMENTS

| | | | |
|---|---|---|---|
| 3,857,754 | 12/1974 | Hirata et al. | 525/57 |
| 4,500,677 | 2/1985 | Maruhashi et al. | 525/57 |
| 4,645,645 | 2/1987 | Negi et al. | 525/57 |

Primary Examiner—Ellis P. Robinson
Assistant Examiner—James J. Seidleck
Attorney, Agent, or Firm—Antonelli, Terry & Wands

[57] ABSTRACT

A laminate comprising a layer of a composition (A) of 100 parts by weight of a hydrolyzed ethylene-vinyl acetate copolymer having an ethylene content of 20 to 55% by mole and a degree of hydrolysis of at least 90% by mole and 1 to 100 parts by weight of a thermoplastic polyester having a glass transition temperature of $-50°$ to 25° C. and a heat of fusion of not more than 30 joules/g, the acid component of the polyester being a mixture of 20 to 70% by mole of an aromatic dicarboxylic acid and 80 to 30% by mole of an aliphatic dicarboxylic acid, and the glycol component of the polyester being an alkylene glycol having 2 to 6 carbon atoms; and a layer of a composition (B) of at least one polymer selected from the group consisting of a polyolefin, a polystyrene, a polyvinyl chloride, a polyamide, a polycarbonate and a polyester having a glass transition temperature of not less than 30° C. The laminate of the invention has improved flex crack resistance, drawability and heat moldability as well as excellent gas impermeability.

8 Claims, No Drawings

LAMINATE

CROSS-REFERENCE TO RELATED APPLICATION

This is a continuation-in-part of application Ser. No. 115,041 filed on Oct. 30, 1987, now abandoned.

BACKGROUND OF THE INVENTION

The present invention relates to a laminate having excellent gas impermeability, and more particularly to a laminate having improved flex crack resistance, drawability and heat moldability as well as excellent gas impermeability.

A hydrolyzed ethylene-vinyl acetate copolymer (hereinafter referred to as "EVOH copolymer") is thermoplastic and is excellent in transparency, antistatic property, oil resistance, solvent resistance, gas impermeability and odor retaining property. However, the EVOH copolymer is poor in impact resistance, flex crack resistance, drawability, heat moldability, gas impermeability under high humidity, and the like.

Therefore, it is proposed in Japanese Examined Patent Publication No. 6192/1974 that one side of the EVOH copolymer film is provided with a low density polyethylene layer and the other side is provided with a film such as polypropylene, nylon or polyester film, thereby improving the defects of EVOH copolymer such as poor impact strength, heat moldability and moisture resistance with maintaining the advantages of EVOH copolymer such as excellent gas impermeability, odor retaining property and property for preventing discoloration of foods.

On the other hand, in order to improve the impact resistance and drawability of the EVOH copolymer without impairing remarkably advantages thereof, Japanese Examined Patent Publication No. 24277/1969 proposes to blend a polyamide with the EVOH copolymer or Japanese Unexamined Patent Publication No. 139733/1985 or No. 161453/1985 proposes to blend a polyamide-polyether block copolymer with the EVOH copolymer.

However, in the laminating method in Japanese Examined Patent Publication No. 6192/1974, the flex crack resistance of the laminated film having EVOH copolymer layer as a gas impermeable layer is unsatisfactory. Therefore, when flexing the laminated film, it is easy to generate pin holes in the EVOH copolymer layer, and on the other hand, in thermoforming such as deep drawing, it is hard to draw the EVOH copolymer layer evenly, thereby impairing the gas impermeability, thus resulting in remarkable limitation of the use of the laminated film as wrapping or packaging materials.

On the other hand, when blending the polyamide with the EVOH copolymer, the impact resistance and drawability can be improved, but there is a defect that gas impermeability is greatly lowered. Also, the EVOH copolymer blended with the polyamide-polyether block copolymer has the improved flex crack resistance and drawability as well as excellent gas impermeability, but laminated films prepared therefrom is unsatisfactory in flex crack resistance or drawability.

An object of the present invention is to provide a laminate having improved flex crack resistance, drawability and heat moldability as well as excellent gas impermeability.

This and the other objects of the present invention will become apparent from the following description.

SUMMARY OF THE INVENTION

In accordance with the present invention, there is provided a laminate comprising (A) a layer of a composition consisting essentially of 100 parts by weight of an EVOH copolymer having an ethylene content of 20 to 55% by mole and a degree of hydrolysis of at least 90% by mole and 1 to 100 parts by weight of a thermoplastic polyester having a glass transition temperature of $-50°$ to 25° C. and a heat of fusion of not more than 30 joules/g; the acid component of the thermoplastic polyester being a mixture of 20 to 70% by mole of an aromatic dicarboxylic acid of at least one of terephthalic acid and isophthalic acid and 80 to 30% by mole of an aliphatic dicarboxylic acid of at least one of adipic acid and sebacic acid, and the glycol component of the thermoplastic polyester being an alkylene glycol having 2 to 6 carbon atoms; and (B) a layer of a composition consisting esentially of at least one polymer selected from the group consisting of a polyolefin, a polystyrene, a polyvinyl chloride, a polyamide, a polycarbonate and a polyester having a glass transition temperature of not less than 30° C.

DETAILED DESCRIPTION

It is essential to improve the adhesive strength between the EVOH copolymer layer and other resin layers laminated therewith as well as to the improve flex crack resistance or drawability of the EVOH copolymer layer itself, for improving the flex crack resistance of the laminated film having the EVOH copolymer layer as the gas impermeable layer, in other words, for improving generation of pin holes in the gas impermeable layer (EVOH copolymer layer), and for drawing the EVOH copolymer layer evenly. When 1 to 100 parts by weight, preferably from 5 to 50 parts by weight, of the thermoplastic polyester having a glass transition point (Tg) of $-50°$ to 25° C. and a heat of fusion ($\Delta$Hu) of not more than 30 joules/g is blended with 100 parts by weight of the EVOH copolymer having an ethylene content of 20 to 55% by mole and a degree of hydrolysis of at least 90% by mole, the adhesive strength between the EVOH copolymer layer and layers of other resin such as the polyolefin, polystyrene, polyvinyl chloride, polyamide, polycarbonate or polyester having a glass transition temperature of not less than 30° C. can be improved as well as the flex crack resistance, drawability and heat moldability of the EVOH copolymer can be improved without imparing excellent properties such as gas impermeability and transparency of EVOH copolymer. When the layer of the EVOH copolymer blended with the above-mentioned specific thermoplastic polyester is laminated with the layer of the other resin such as polyethylene, nylon or polyethylene terephthalate (PET), there can be obtained laminates with gas impermeable layer having excellent flex crack resistance, drawability and heat moldability.

In the present invention, it is necessary to employ the EVOH copolymer having an ethylene content of 20 to 55% by mole and a degree of hydrolysis in the vinyl acetate component of at least 90% by mole, preferably at least 95% by mole. When the ethylene content is less than 20% by mole, the extrusion processability or injection processability is inferior and the gas impermeability under high humidity is unsatisfactory. On the other hand, when the ethylene content is more than 55% by mole, the gas impermeability under not only high humidity but low humidity becomes unsatisfactory. When the degree of hydrolysis is less than 90% by mole, the gas impermeability and water resistance are lowered.

It is preferable to use an EVOH copolymer having an intrinsic viscosity [η] (measured at 30° C. in a 15% by weight aqueous solution of phenol) of 0.7 to 1.5 dl/g in addition to the ethylene content and the degree of hydrolysis within the ranges as mentioned above, from the standpoints of the mechanical strength and processability.

The EVOH copolymer used in the invention may include a small amount of comonomers, e.g. α-olefins such as propylene, isobutene, α-octene, α-dodecene and α-octadecene; an unsaturated carboxylic acid, and their salts, partial or complete alkyl esters, nitriles, amides and anhydrides; and unsaturated sulfonic acids and their salts, and the like, so long as the excellent properties of EVOH copolymer such as excellent transparency and gas impermeability are not lowered.

In the present invention, as the thermoplastic polyester to be blended with the EVOH copolymer, it is necessary to use a thermoplastic polyester having a glass transition temperature (Tg) of −50° to 25° C., preferably from −35° to 5° C. and a heat of fusion (ΔHu) of not more than 30 joules/g, preferably from 5 to 25 joules/g. When the Tg is less than −50° C., the composition of the EVOH copolymer and the thermoplastic polyester forms a block to impair workability. On the other hand, when the Tg is more than 25° C., there are problems in flex crack resistance and drawability of the obtained laminate. When the heat of fusion (ΔHu) is more than 30 joules/g, the flex crack resistance and drawability of the obtained laminate are lowered. The thermoplastic polyester has an intrinsic viscosity [η] measured at 30° C. in a solution of cresol and 1,1,2,2-tetrachloroethane (1:1 by weight) of 0.3 to 2.0 dl/g.

As the above-mentioned thermoplastic polyester, there are exemplified, for instance, thermoplastic polyesters wherein the acid component is a mixture of 20 to 70% by mole of an aromatic dicarboxylic acid of terephthalic acid and/or isophthalic acid and 80 to 30% by mole of an aliphatic dicarboxylic acid of adipic acid and/or sebacic acid, and the glycol component is an alkylene glycol having 2 to 6 carbon atoms, and the like. Examples of the glycol are, for instance, 1,6-hexanediol, 1,4-buthanediol, ethylene glycol, propylene glycol, and the like.

The thermoplastic polyester is blended with the EVOH copolymer in an amount of 1 to 100 parts by weight based on 100 parts by weight of the EVOH copolymer. When the amount of the polyester is less than 1 part by weight, the effects of this invention cannot be obtained. On the other hand, when the amount is more than 100 parts by weight, the physical properties of EVOH were impaired.

In the present invention, the laminate has the layer of the composition (A) consisting essentially of the above-mentioned EVOH copolymer and the thermoplastic polyester.

Also, the laminate of the present invention has the layer of the composition (B) consisting essentially of at least one polymer selected from the group consisting of a polyolefin, a polystylene, a polyvinyl chloride, a polyamide, a polycarbonate and a polyester having a Tg of not less than 30° C. Examples of the polyester are, for instance, polyethylene terephthalate and the like.

The laminate of the present invention includes not only laminated films, laminated sheets, laminated tubes, laminated pipes and laminated bottles which are composed of the layer of the composition (A) and the layer of the polymer composition (B) but also bags, caps and vesseles prepared from the above laminates by secondary processing such as bag making processing, vacuum forming, drawing or shrinking.

In the present invention, at least one of the composition (A) and the composition (B) may be formed into a film or sheet. In such a case, it is necessary to use an adhesive for laminating the layer (A) and the layer (B). Examples of the adhesives are, for instance, a polyester adhesive, a polyurethane adhesive, an acrylic adhesive, an imine adhesive, and the like.

When the laminate is prepared by coextrusion or multi-injection molding of the composition (A) and the composition (B) in the melting state, it is not always necessary to provide an adhesive layer between the layer (A) and the layer (B). If necessary, it is possible to use a carboxylic acid and/or a carboxylic anhydridemodified polypropylene, polyethylene or ethylene-vinyl acetate copolymer as the adhesive layer.

The laminate of the present invention includes a laminate having a structure wherein the one layer (A) is provided between the two layers (B), (B/A/B) as well as a laminate having a structure composed of the one layer (A) and the one layer (B) (A/B).

As mentioned above, the laminate of the invention has remarkably improved flex crack resistance (property for preventing generation of pin holes at flexing), drawability and heat moldability as well as excellent gas impermeability. Therefore, the laminates are extremely suitable for use of wrapping and packaging materials including wrapping and packaging materials for foods.

The present invention is more specifically described and explained by means of the following Examples and Comparative Examples in which all percents and parts are by weight unless otherwise noted. It is to be understood that the present invention is not limited to the Examples, and various changes and modifications may be made in the invention without departing from the spirit and scope thereof.

EXAMPLE 1

A 5-layer extruded film was produced by employing a coextruder. The obtained film had a structure wherein an intermediate layer ($A_1$) were provided between two external layers ($B_1$) through adhesive layers ($C_1$) [$B_1/C_1/A_1/C_1/B_1$]. Each of the layers were prepared from the following components.

The layer ($A_1$): A composition of 90 parts of an EVOH copolymer (an ethylene content: 32% by mole, a degree of hydrolysis: 99% by mole) and 10 parts of a thermoplastic polyester (Tg: −25° C., ΔHu: 13 joules/g, [η]: 1.5 dl/g)

The thermoplastic polyester having the Tg of −25° C. and the ΔHu of 13 joules/g was produced as follows:

A reactor was charged with 45 parts of an acid component of 55% by mole of terephthalic acid, 25% by mole of adipic acid and 20% by mole of sebacic acid and 55 parts of 1,4-buthanediol, and the condensation reaction was carried out in the presence of 0.015 part of tetraisopropyl titanate as a catalyst at a temperature range of 140° to 220° C. for 4 to 5 hours, then at a temperature of 220° C. for 2 hours, and finally, the reaction was continued at a temperature of not less than 250° C.

under a reduced pressure of 0.2 mmHg until the intrinsic viscosity of the polyester reached to 1.5 dl/g.

The layer ($B_1$): A low density polyethylene [a melt index (MI): 3.0 g/10 minutes, a density: 0.924 g/cc]

The layer ($C_1$): An adhesive of polyethylene modified with maleic anhydride.

The thickness of the film [$B_1/C_1/A_1/C_1/B_1$]: 15μ/5μ/10μ/5μ/45μ

The conditions of the coextrusion were as follows:

Extruder used for molding the layer ($A_1$) [hereinafter referred to as "Extruder ($A_1$)"]:
Diameter of extruder: 30 mm
Screw: Full-flighted screw,
L/D = 28
Extrusion temperature:
Feed zone: 180° C.
Compression zone: 200° C.
Metering zone: 220° C.
Extrusion output: 3 kg/hour Extruder ($C_1$):
Diameter of extruder: 30 mm
Screw: Full-flighted screw,
L/D = 26
Extrusion temperature:
Feed zone: 160° C.
Compression zone: 200° C.
Metering zone: 220° C.
Extrusion output: 1.5 kg/hour Extruder ($B_1$):
Diameter of extruder: 40 mm
Screw: Full-flighted screw,
L/D = 24
Extrusion temperature:
Feed zone: 200° C.
Compression zone: 210° C.
Metering zone: 210° C.
Extrusion output: 9.0 kg/hour
Temperature of feed block: 220° C.
Temperature of die: 220° C.

The obtained laminated film was conditioned at 20° C. under 65% RH for 10 days. As to the laminated film, an adhesive strength between the layer ($A_1$) and the layer $B_1$) and an oxygen permeability were measured. After a flex crack resistance test according to the following method, the oxygen permeability of the film was again measured. The results are shown in Table 1.

[Adhesive strength]

A test specimen having a width of 15 mm and a length of 80 mm was prepared from the obtained laminated film, and the adhesion between the layer ($A_1$) and the layer $B_1$) was measured by subjecting to T-peeling test, using a tensile tester (Autograph S-100 made by Shimadzu Corporation) [a distance between the chucks: 60 mm, a test speed: 300 mm/minute].

The measurement was repeated 6 times and an average value of them is shown in Table 1.

[Flex crack resistance test of the laminated film]

As to the same test specimen as used in the measurement of the adhesive strength, flex crack resistance test is carried out 50 times or 500 times by using a Gelbo flex tester which is designed in accordance with FED test method standard No. 101B, Method 2017. In one flex crack resistance test, the twisting motion of 400° in 3.25 inches of the stroke is imparted.

[Oxygen permeability]

Oxygen permeability was measured by using OX-TRAN 10/50 made by MODERN CONTROLS, INC. at a temperature of 25° C. under 75% RH (relative humidity).

COMPARATIVE EXAMPLE 1

The procedure of Example 1 was repeated except that an layer ($A_1'$) prepared from the same EVOH copolymer used in Example 1 (an ethylene content: 32% by mole, a degree of hydrolysis: 99% by mole) alone was used instead of the layer ($A_1$) to give a laminated film having five layers [$B_1/C_1/A_1'/C_1/B_1$].

As to the obtained laminated film, the adhesion between the layer ($A_1'$) and the layer ($B_1$) and the oxygen permeability before and after the flex crack resistance test were measured in the same manner as in Example 1. The results are shown in Table 1.

COMPARATIVE EXAMPLE 2 and 3

The procedure of Example 1 was repeated except that an layer ($A_1''$) (Comparative Example 2), or a layer ($A_1'''$) (Comparative Example 3) was used instead of the layer ($A_1$) to give a laminated film having five layers [$B_1/C_1/A_1''/C_1/B_1$] (Comparative Example 2) or a laminated film having five layers [$B_1/C_1/A_1'''/C_1/B_1$] Comparative Example 3].

The layer ($A_1''$): A composition of 90 parts of the same EVOH copolymer as used in Example 1 and 10 parts of a thermoplastic polyester (Tg: −60° C., ΔHu: 20 joules/g, [η]: 1.6 dl/g)

The thermoplastic polyester having the Tg of −60° C. and the ΔHu of 20 joules/g was prepared as follows: The reactor was charged with 45 parts of an acid component of 60% by mole of terephthalic acid and 40% by mole of sebacic acid and 55 parts of a glycol component of 40% by mole of 1,4-butanediol and 60% by mole of polytetramethylene glycol (molecular weight: 1000) and the condensation reaction was conducted in the same manner as in Example 1 until the intrinsic viscosity of the polyester reached to 1.6 dl/g.

The layer [$A_1'''$: A composition of 90 parts of the same EVOH copolymer as used in Example 1 and 10 parts f a thermoplastic polyester (Tg: 40° C., ΔHu 20 joules/g, [η]: 1.3 dl/g)

The thermoplastic polyester having the Tg of 40° C. and the ΔHu of 20 joules was prepared as follows:

The reactor was charged with 40 parts of an acid component of 90% by mole of terephthalic acid and 10% by weight of adipic acid and 60 parts of 1,4butanediol and the codensation reaction was conducted in the same manner as in Example 1 until the intrinsic viscosity of the polyester reached to 1.3 dl/g.

TABLE 1

|  | Adhesive strength (g/15 mm) | Oxygen permeability ($cc/m^2 \cdot 24$ hour) | | |
|---|---|---|---|---|
|  |  | Before the test | 50 times | 500 times |
| Ex. 1 | 850 | 1.8 | 1.8 | 2.5 |
| Com. Ex. 1 | 550 | 1.5 | >2000 | >2000 |
| Com. Ex. 2 | 210 | 1.8 | 1.8 | 2.9 |
| Com. Ex. 3 | 780 | 1.8 | 2.7 | >2000 |

EXAMPLE 2

A laminated film having three layers was prepared by using a coextruder. The obtained laminated film had a structure wherein a layer ($A_2$) was provided on one side of a layer (B₂) through an adhesive layer (C₂) [A₂/C₂/B₂].

The layer (A₂) was prepared from the same composition as one of the layer (A₁) in Example 1 by using the same extruder as the extruder (A₁) in Example 1. The layer (B₂) was prepared from the same polyethylene as one of the layer (B₁) in Example 1 by using the same extruder as the extruder (B₁) in Example 1. The layer (C₂) was prepared from the same adhesive resin as one of the layer (C₁) in Example 1 by using the same extruder as the extruder (C₁) in Example 1. The thickness of the film [A₂/C₂/B₂]: 10μ/5μ/45 μ.

Then, a biaxially oriented nylon film (B₃) having a thickness of 15μ was dry laminated on the layer (A₂) by using an adhesive (a mixture of Adcoat 527 and Adcoat 9L-1 made by Toyo Moton Kabushiki Kaisha) to give a laminated film having four layers [B₃/A₂/C₂/B₂]. The obtained laminated film was conditioned at 20° C. under 65% RH for 10 days.

The adhesive strength between the layer (A₂) and the layer (B₃), and the oxygen permeability before and after flex crack resistance test were measured in the same manner as in Example 1. The results are shown in Table 2.

COMPARATIVE EXAMPLE 4

The procedure of Example 2 was repeated except that a layer (A₂') prepared from the same EVOH copolymer as used in Example 2 (an ethylene content: 32% by mole, a degree of hydrolysis: 99% by mole) alone to give a laminated film having four layers [B₃/A₂″/C₂/B₂].

As to the obtained laminated film, the adhesive strength between the layer (A₂') and the layer (B₃), and the oxygen permeability before and after the flex crack resistance test were measured in the same manner as in Example 1. The results are shown in Table 2.

COMPARATIVE EXAMPLE 5

The procedure of Example 2 was repeated except that a layer (A₂″) prepared from a composition of 90 parts of the same EVOH copolymer as used in Example 2 (an ethylene content: 32% by mole, a degree of hydrolysis: 99% by mole) and 10 parts of a copolymer of nylon 6 and nylon 66 having a high viscosity (a melting temperature: 190° C., ΔHu: 45 joules/g) was used instead of the layer (A₂) to give a laminated film having four layers [B₃/A₂″/C₂/B₂].

As to the laminated film, the adhesive strength between the layer (A₂″) and the layer (B₃), and the oxygen permeability before and after the flex crack resistance test were measured in the same manner as in Example 1. The results are shown in Table 2.

TABLE 2

| | Adhesive strength (g/15 mm) | Oxygen permeability (cc/m² · 24 hours) | | |
| --- | --- | --- | --- | --- |
| | | Before the test | 50 times | 500 times |
| Ex. 2 | 300 | 2.0 | 2.0 | 10.5 |
| Com. Ex. 4 | 180 | 1.9 | >2000 | >2000 |
| Com. Ex. 5 | 190 | 3.4 | 3.8 | >2000 |

EXAMPLE 3

A laminated film having three layers was prepared by using a coextruder. The laminated film had a structure wherein a layer (A₃) was provided on one side of a layer (B₄) through an adhesive layer (C₃) [A₃/C₃/B₄]. The layers were prepared from the following components.

The layer (A₃): A composition of 90 parts of an EVOH copolymer (an ethylene content: 38% by mole, a degree of hydrolysis: 99% by mole) and 10 parts of a thermoplastic polyester (Tg: −30° C., ΔHu: 17 joules/g , [η]: 1.0 dl/g)

The thermoplastic polyester having the Tg of −30° C. and the ΔHu of 17 joules/g was prepared as follows:

The reactor was charged with 40 parts of an acid component of 40% by mile of terephthalic acid and 60% by mole of adipic acid and 60 parts of 1,4-buthanediol and the condensation reaction was conducted in the same manner as in Example 1 until the viscosity of the polyester reached to 1.0 dl/g.

The layer (B₄): A nylon 6 (relative viscosity: 4.5)
The layer (C₃): A low density polyethylene modified with maleic anhydride (MI: 4.5 g/10 minutes)

The same extrusion conditions as in Examples 1 applied to the extrusion in Example 3 except that a die temperature was 245° C., the layer (B₄) was extruded under the following conditions and the extrusion output for the layer (C₃) was 0.75 kg/hour.

The coextrusion conditions of nylon 6 were as follows:

| Extruder (B₄): |
| --- |
| Diameter of extruder: 30 mm |
| Screw: Rapid compression full-flight screw |
| L/D = 26 |
| Extrusion temperature: |
| Feed zone: 220° C. |
| Compression zone: 250° C. |
| Metering zone: 255° C. |
| Extrusion output: 2.2 kg/hour |

A low density polyethylene film (B₅) with a thickness of 45μ was dry laminated on the layer (A₃) by using an adhesive (a mixture of Adcoat AD-335 and Adcoat F which were made by Toyo Moton Kabushiki Kaisha) to give a laminated film having four layers [B₅/A₃/C₃/B₄]. The obtained laminated film was conditioned at 20° C. under 65% RH for 10 days.

As to the film, the adhesive strength between the layer (A₃) and the layer (B₄) and the oxygen permeability before and after flex crack resistance test were measured in the same manner as in Example 1. The results are shown in Table 3.

COMPARATIVE EXAMPLE 6

The procedure of Example 3 was repeated except that a layer (A₃') prepared from the same EVOH copolymer as used in Example 3 (an ethylene content: 38% by mole, a degree of hydrolysis: 99% by mole) alone was used instead of the layer (A₃) to give a laminated film having four layers [B₅/A₃'/C₃/B₄].

As to the film, the adhesive strength between the layer (A₃') and the layer (B₄) and the oxygen permeability of the film before and after the flex crack resistance test were measured in the same manner as in Example 1. The results are shown in Table 3.

COMPARATIVE EXAMPLE 7

The procedure of Example 3 was repeated except that a layer (A₃″) prepared from a composition of 90 parts of the same EVOH copolymer as used in Example 3 (an ethylene content: 38% by mole, a degree of hydrolysis: 99% by mole) and 10 parts of a polyether-polyamide block copolymer (a Shore D hardness: 50, a melting temperature: 165° C., Tg: 197° C., ΔHu: 37 joules/g) was used instead of the layer (A₃) to give a laminated film having four layers [B₅/A₃″/C₃/B₄].

As to the obtained film, the adhesive strength between the layer (A₃″) and the layer (B₄) and the oxygen permeability before and after the flex crack resistance test were measured in the same manner as in Example 1. The results are shown in Table 3.

TABLE 3

|  | Adhesive strength (g/15 mm) | Oxygen permeability (cc/m² · 24 hour) | |
|---|---|---|---|
|  |  | Before the test | 50 times |
| Ex. 3 | 680 | 1.7 | 1.8 |
| Com. Ex. 6 | 685 | 1.5 | >2000 |
| Com. Ex. 7 | 310 | 2.1 | 4.5 |

EXAMPLE 4

A 5-layer extruded sheet was produced by employing the same coextruder as one used in Example 1. The obtained sheet had a structure wherein an intermediate layer (A₄) was provided between two external layers (B₆) through adhesive layers (C₄) [B₆/C₄/A₄/C₄/B₆]. The layers were prepared from the following components.

The layer (A₄): A composition of 90 parts of an EVOH copolymer (an ethylene content: 32% by mole, a degree of hydrolysis: 99% by mole) and 10 parts of a thermoplastic polyester (Tg: −25° C., ΔHu: 20 joules/g, [η]: 0.7 dl/g)

The thermoplastic polyester having the Tg of −25° C. and the ΔHu of 20 joules/g was prepared as follows The reactor was charged with 45 parts of an acid component of 60% by mole of terephthalic acid, 30% by mole of adipic acid and 10% by mole of sebacic acid, and 55 parts of 1,4 buthanediol and the condensation reaction was conducted in the same manner as in Example 1 until the intrinsic viscosity of the polyester reached to 0.7 dl/g.

The layer (B₆): A polypropylene (MI: 0.7 g/10 minutes, a density: 0.90)

The layer (C₄): An adhesive of polypropylene modified with carboxylic anhydride (MI: 2.5 g/10 minutes)

The thickness of: [B₆/C₄/A₄/C₄/B₆]: 480μ/30μ/50μ/30μ/430μ

The conditions of the coextrusion were as follows:

Extruder (A₄):
Diameter of extruder: 40 mm
Screw: Full-flighted screw, L/D = 28
Extrusion temperature:
Feed zone: 180° C.
Compression zone: 200° C.
Metering zone: 210° C.
Extrusion output: 3 kg/hour
Extruder (B₆):
Diameter of extruder: 60 mm
Screw: Full-flighted screw, L/D = 26
Extrusion temperature:
Feed zone: 170° C.
Compression zone: 210° C.
Metering zone: 230° C.
Extrusion output: 55 kg/hour
Extruder (C₄):
Diameter of extruder: 40 mm
Screw: Full-flighted screw, L/D = 26
Extrusion temperature:
Feed zone: 190° C.
Compression zone: 210° C.
Metering zone: 230° C.
Extrusion output: 3.5 kg/hour
Temperature of feed block: 230° C.
Temperature of die: 220° C.

The obtained sheet was conditioned at 20° C. under 65% RH for 10 days. As to the sheet, the adhesive strength between the layer (A₄) and the layer (B₆) was measured. The results are shown in Table 4.

The sheet was thermoformed at a drawing temperature of 145° C. and at a drawing ratio of 0.9 to give a cup with a diameter at the opening of 90 mm a diameter at the bottom of 80 mm, and at a drawing ratio of 1.9 to give a cup with a diameter at the opening of 68 mm and a diameter at the bottom of 48 mm. The cups were conditioned at 20° C. under 65% RH for 10 days.

As to each of the cups, the appearance was observed with the naked eye, and the oxygen permeability was measured at a temperature of 20° C. under 65% RH in the outside of the cup and 100% RH in the inside thereof. The results are shown in Table 4.

COMPARATIVE EXAMPLE 8 and 9

The procedure of Example 4 was repeated except that a layer (A₄′) prepared from the same EVOH copolymer as used in Example 4 (an ethylene content: 32% by mole, a degree of hydrolysis: 99% by mole) alone (Comparative Example 8), or a layer (A₄″) prepared from the same EVOH copolymer as used in Example 3 (an ethylene content: 38% by mole, a degree of hydrolysis: 99% by mole (Comparative Example 9) alone was used instead of the layer (A₄) to give a sheet [B₆/C₄/A₄′/B₆] (Comparative Example 8) or a sheet [B₆/C₄/A₄″/C₄/B₆] (Comparative Example 9).

As to the obtained sheet, the adhesive strength between the layer (A₄′) and the layer (B₆) or the adhesion between the layer (A₄″) and the layer (B₆) was measured in the same manner as in Example 1.

Each of the obtained sheets was formed into two cups in the same manner as in Example 4. The cups were observed with the naked eye. The oxygen permeability of the cu7s were measured in the same manner as in Example 4. The results are shown in Table 4.

TABLE 4

|  | Adhesive strength (g/15 mm) | Drawing ratio: 0.9 (diameter at the opening/diameter at the bottom: 90 mm/80 mm) | | Drawing ratio: 1.9 (diameter at the opening/diameter at the bottom: 68 mm/48 mm) | |
|---|---|---|---|---|---|
|  |  | Appearance | Oxygen permeability (cc/cup · 24 hours) | Appearance | Oxygen permeability (cc/cup · 24 hours) |
| Ex. 4 | 1500 | *1 | 0.003 |  | 0.006 |
| Com. Ex. 8 | 1100 | *2 | 0.003 | X*4 | >2000 |

TABLE 4-continued

| | Adhesive strength (g/15 mm) | Drawing ratio: 0.9 (diameter at the opening/diameter at the bottom: 90 mm/80 mm) | | Drawing ratio: 1.9 (diameter at the opening/diameter at the bottom: 68 mm/48 mm) | |
|---|---|---|---|---|---|
| | | Appearance | Oxygen permeability (cc/cup · 24 hours) | Appearance | Oxygen permeability (cc/cup · 24 hours) |
| Com. Ex. 9 | 950 | | 0.009 | Δ*3 | >2000 |

(Note) Estimation
*1 : Any crack cannot be observed in the EVOH layer.
*2 : Slight cracks can be observed in the EVOH layer if scrutinized.
*3 Δ: Some cracks can be observed in the EVOH layer.
*4 X: Clear cracks can be observed in the EVOH layer.

Example 5

A parison with the bottom having five layers was prepared by using a three-layer injection molding machine. The obtained parison had a structure wherein an intermediate layer ($A_6$) was provided between two external layers ($B_8$) through adhesive layers ($C_6$) [$B_8/C_6/A_6/C_6/B_8$]. The layers were prepared from the following components.

The layer ($A_6$) A composition of 90 parts of an EVOH copolymer (an ethylene content: 32% by mole, a degree of hydrolysis: 99% by mole and 10 parts of a thermoplastic polyester (Tg: $-15°$ C., ΔHu: 10 joules/g, [η]: 0.8 dl/g)

The thermoplastic polyester having the Tg of $-15°$ C. and the ΔHu of 10 joules/g was prepared as follows:

The reactor was charged with 40 parts of an acid component of 60% by mole of terephthalic acid, 20% by mole of adipic acid and 20% by mole of sebacic acid and 60 parts of a glycol component of 40% by mole of 1,4-buthanediol and 60% by mole of ethylene glycol, and the condensation reaction was conducted in the same manner as in Example 1 until the intrinsic viscosity of the polyester reached to 0.8 dl/g.

The layer ($B_8$) A polyethylene terephthalate (MI: 1.8 g/10 minutes, a melting temperature: 155° C., Tg: 73° C.)

The layer ($C_6$) An adhesive of an ethylene-vinyl acetate copolymer modified with maleic anhydride (MI: 8 g/10 minutes).

The obtained parison had an outside diameter of 30 mm, a length of 100 mm and a thickness of 4 mm. The injection conditions were as follows:

Cylinder temperature:
the layer ($A_6$): 240° C.
the layer ($B_8$): 275° C.
the layer ($C_6$): 230° C.
Temperature of die: 25° C.
Maintaining time of the injection pressure: 8 seconds
Cooling time: 12 seconds
Ratio of the components:
the component ($A_6$): the component ($B_8$): the component ($C_6$) = 5% by volume: 75% by volume: 20% by volume
Injection speed:
the layer ($A_6$): 10 ml/second
the layer ($B_8$): 10 ml/second
the layer ($C_6$): 15 ml/second The obtained parison was formed into a 5-layer bottle by using a biaxial stretching blow molding machine. That is, the surface temperature of the parison was heated to 95° C. by using a quartz heater and then the parison was molded in a blow mold under conditions being a speed of the stretching rod of 20 cm/second and a blowing pressure of 20 kg/cm$^2$ to give a 5-layer bottle having a length of 275 mm, an outside diameter of 80 mm and a capacity of 1000 ml.

The obtained bottle was conditioned at 20° C. under 65% RH for 10 days.

The adhesive strength between the layer ($A_6$) and the layer ($B_8$) in the barrel part of the bottle was measured in the same manner as in Example 1. The oxygen permeability was measured by using OXTRAN 10/50 at a temperature of 20° C. under 65% RH in the outside of the bottle and 100% RH in the inside of the bottle. The results are shown in Table 6.

COMPARATIVE EXAMPLE 10

The procedure of Example 5 was repeated except that a layer ($A_6'$) prepared from the same EVOH copolymer as used in Example 5 (an ethylene content: 32% by mole, a degree of hydrolysis: 99% by mole) alone was used instead of the layer ($A_6$) to give a 5-layer bottle.

As to the bottle, the adhesive strength and the oxygen permeability were measured in the same manner as in Example 5. The results are shown in Table 5.

TABLE 6

| | Adhesive strength (g/15 mm) | Oxygen permeability (cc/bottle 24 hours) |
|---|---|---|
| Ex. 5 | 690 | 0.04 |
| Com. Ex. 10 | 510 | 0.08 |

In addition to the ingredients used in the Examples, other ingredients can be used as set forth in the specification to obtain substantially the same results.

What we claim is:

1. A laminate comprising a layer of a composition (A) consisting essentially of 100 parts by weight of a hydrolyzed ethylene-vinyl acetate copolymer having an ethylene content of 20 to 55 by mole and a degree of hydrolysis of at least 90% by mole and 1 to 100 parts by weight of a thermoplastic polyester having a glass transition termperature of $-50°$ to 25° C. and a heat of fusion of not more than 30 joules/g, the acid component of said thermoplastic polyester being a mixture of 20 to 70% by mole of an aromatic dicarboxylic acid of at least one of terephthalic acid and isophthalic acid and 80 to 30% by mole of an aliphatic dicarboxylic acid of at least one of adipic acid and sebasic acid, and the glycol component of said thermoplastic polyester being an alkylene glycol having 2 to 6 carbon atom; and a layer of a composition (B) comprising at least one polymer selected from the group consisting of a polyolefin, a polystyrene, a polyvinyl chloride, a polyamide, a polycarbonate and a polyester having a glass transition temperature of not less than 30° C.

2. The laminate of claim 1, wherein said thermoplastic polyester has an intrinsic viscosity of 2.0 dl/g.

3. The laminate of claim 1, which is in the form of a film.

4. The laminate of claim 1, which is in the form of a sheet.

5. The laminate of claim 1, which is in the form of a laminated tube.

6. The laminate of claim 1, which is in the form of a laminated pipe.

7. The laminate of claim 1, which is in the form of a laminated vessel.

8. The laminate of claim 1, which has a structure wherein said layer of said composition (A) is provided between said two layers of said composition (B).

* * * * *